C. F. PHIPPS.
SEED CORN HANGER.
APPLICATION FILED DEC. 29, 1909.
982,864.
Patented Jan. 31, 1911.
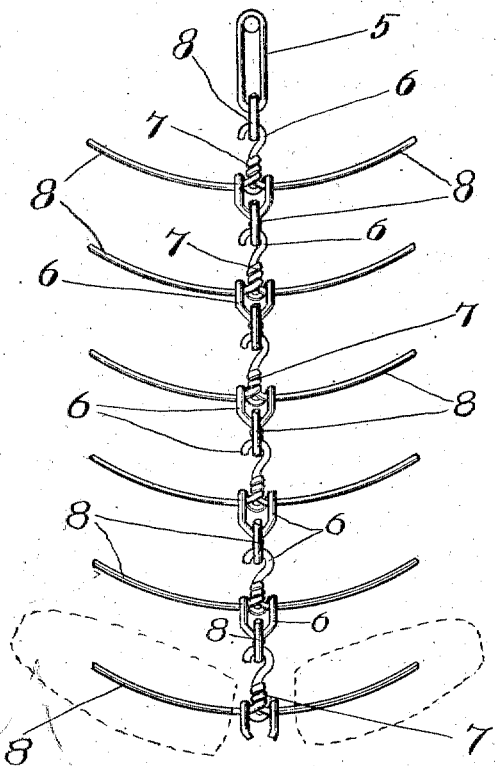
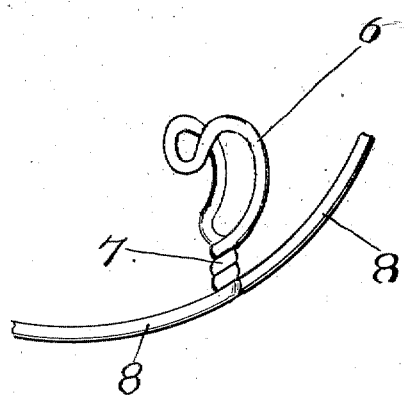
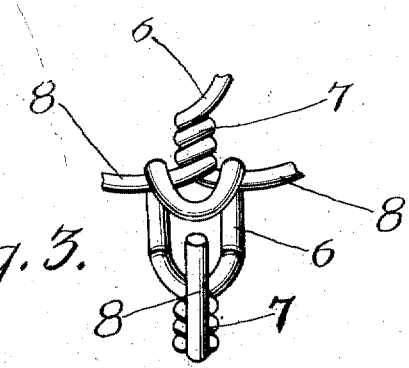
Inventor:
Charles Fred Phipps.
Witnesses:

UNITED STATES PATENT OFFICE.

CHARLES FRED PHIPPS, OF TRIVOLI, ILLINOIS.

SEED-CORN HANGER.

982,864.

Specification of Letters Patent.

Patented Jan. 31, 1911.

Application filed December 29, 1909. Serial No. 535,416.

*To all whom it may concern:*

Be it known that I, CHARLES FRED PHIPPS, a citizen of the United States, residing at Trivoli, in the county of Peoria and State of Illinois, have invented certain new and useful Improvements in Seed-Corn Hangers, of which the following is a specification.

My invention relates to a seed corn hanger, used for drying or maturing seed corn.

The principal object of my invention is to provide a device of the above character, of such construction that the ears of corn carried thereby will be entirely separated from each other, thereby allowing a free circulation of air around each ear, and also rendering it easy to identify each ear with the grains that may be taken therefrom for testing purposes.

A further object of my invention is to provide a device of this kind which is composed of a number of separate sections, on which the ears of corn are to be placed, said sections adapted to be linked together to form a hanger of any desired length, and which, when unlinked, may be stored or shipped in a comparatively small space.

Other objects and their advantages will become apparent as the nature of my invention is better understood from the following description and accompanying drawings, in which—

Figure 1 is a side elevation of a portion of a hanger constructed in accordance with my invention. Fig. 2 is an enlarged perspective view of one of the sections of the hanger, and Fig. 3 is an enlarged detail.

Reference being had to the drawings, it will be seen that the hanger is composed of a number of sections linked together, the last or top section being provided with a comparatively long loop 5, which is adapted to be placed over a nail or the like, by means of which the hanger is suspended above the floor of the barn or corn crib.

As most clearly shown in Fig. 2, each of the sections of the hanger comprises a single piece of stout wire which is first bent double and provided with a hook 6. The wire is then twisted, as indicated at 7, for the purpose of making the same rigid, and the remaining portions of the wire are then bent outwardly and upwardly in opposite directions to form arms, on which the ears of corn to be matured are impaled, as indicated by dotted lines in Fig. 1. It will be noted that the portions of wire which form the hooks or loops 6 are spaced apart to permit the said hooks to be slipped through one another as the sections are assembled, whereby the hook 6 of one section will engage the arms 8 of the next section above on opposite sides of the twist 7, as shown in Fig. 3. Obviously this arrangement will prevent any possibility of the sections becoming accidentally unlinked.

As shown in Fig. 1, the hook 6 of each section is arranged at right angles to its arms 8, whereby when these sections are linked together, the arms will be arranged in four vertical rows, thus allowing the ears of corn to be easily placed thereon. The ears of corn are impaled on the arms 8 longitudinally, and owing to the upward incline of said arms, any liability of the ears slipping off is prevented.

From the foregoing, it will be seen that I provide a seed corn hanger which, while being extremely simple and inexpensive, will have great strength and durability, and will effectually serve the purpose for which it is intended.

I claim:

1. A seed corn hanger, composed of a number of separate sections linked together, each section comprising a single piece of wire bent double and provided with a spaced hook, the remaining portions of the wire being twisted around each other several times, and then bent outwardly and upwardly in opposite directions, and at right angles to said hook, the hooks of the several sections adapted to be slipped through one another and to engage the arms of the next section above on opposite sides of its twisted portion, thereby securely linking the several sections together.

2. A seed corn hanger comprising a number of separate sections linked together to form a hanger of any desired length, each section comprising a single piece of wire having its central portion bent upwardly to form a loop and having its end extending diagonally outward and upward from the lower end of said loop, said ends adapted to have impaled thereon the ears of corn to be matured.

In testimony whereof I affix my signature in presence of two witnesses.

CHARLES FRED PHIPPS.

Witnesses:
 HENRIETTA PHIPPS,
 R. F. GRAHAM.